(12) United States Patent
Hashimoto et al.

(10) Patent No.: US 8,555,547 B2
(45) Date of Patent: Oct. 15, 2013

(54) PLANT CULTIVATING UNIT AND PLANT CULTIVATING CONTAINER

(75) Inventors: Masaki Hashimoto, Ibaraki (JP);
Katsuro Miyagawa, Takatsuki (JP);
Masayuki Saito, Ibaraki (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 478 days.

(21) Appl. No.: 12/095,106

(22) PCT Filed: Nov. 28, 2006

(86) PCT No.: PCT/JP2006/323640
§ 371 (c)(1),
(2), (4) Date: Apr. 24, 2009

(87) PCT Pub. No.: WO2007/063815
PCT Pub. Date: Jun. 7, 2007

(65) Prior Publication Data
US 2009/0260282 A1    Oct. 22, 2009

(30) Foreign Application Priority Data
Nov. 30, 2005    (JP) ................. 2005-345984

(51) Int. Cl.
*A01G 27/02*        (2006.01)
(52) U.S. Cl.
USPC .............................................. 47/79; 47/48.5
(58) Field of Classification Search
USPC ............. 47/66.1, 66.5, 79, 86, 39, 40.5, 48.5, 47/59 R, 60, 62 R, 62 C, 62 E, 62 N, 63, 47/66.6, 82
IPC ....................................................... A01G 25/00
See application file for complete search history.

(56) References Cited

U.S. PATENT DOCUMENTS 2,531,562 A * 11/1950 Eve .................................. 47/80
4,034,506 A *  7/1977 Kasahara et al. ................. 47/64
(Continued)

FOREIGN PATENT DOCUMENTS

CN    2230076    7/1996
CN    2324772    6/1999
(Continued)

OTHER PUBLICATIONS

Machine translation of JP 3032651, published on Dec. 24, 1996 (cited on PTO-1449 dated May 7, 2012).*

(Continued)

*Primary Examiner* — Rob Swiatek
*Assistant Examiner* — Kathleen Iwasaki
(74) *Attorney, Agent, or Firm* — Drinker Biddle & Reath LLP

(57) ABSTRACT

An object of the present invention is to provide a plant cultivating unit that can perform a watering operation in a simple manner and can supply water uniformly to plants in locations where a floor surface is sloped, such as the rooftop of a building, without requiring separate water supply piping work. A plant cultivating unit (1) comprises a water storage tray (2) in which water can be stored and in which receivers (3) for housing the roots of plants can be arranged in an interior thereof, a water storage space (8) in the water storage tray (2) and the receivers (3) being communicated via water feeders (7), and the water stored in the water storage space (8) being able to be supplied to the plants via the water feeders (7). The water storage tray (2) is provided with connectors (6) capable of communicably connecting adjacent water storage trays (2) to each other, the connectors (6) being configured from an inflow connector (6a) and an outflow connector (6b), the water flowing in through the inflow connector (6a) to the water storage space (8), and the water being able to flow out through the outflow connector (6b) by an overflow when a specific amount of water is stored in the water storage space (8).

15 Claims, 11 Drawing Sheets

(56) References Cited

U.S. PATENT DOCUMENTS

| | | | |
|---|---|---|---|
| 4,468,885 A * | 9/1984 | Mandish | 47/59 R |
| 6,014,838 A * | 1/2000 | Asher | 47/65 |
| 8,371,066 B2 * | 2/2013 | Mathy | 47/66.5 |
| 2004/0016179 A1 * | 1/2004 | Moran | 47/79 |
| 2005/0005518 A1 * | 1/2005 | Iseki et al. | 47/79 |
| 2005/0274073 A1 * | 12/2005 | Brooke et al. | 47/59 R |
| 2006/0112632 A1 * | 6/2006 | Mori et al. | 47/65.8 |
| 2006/0123704 A1 * | 6/2006 | Yoshida et al. | 47/79 |
| 2008/0120903 A1 * | 5/2008 | Fair et al. | 47/65.7 |

FOREIGN PATENT DOCUMENTS

| | | |
|---|---|---|
| JP | 2002-247920 | 9/1992 |
| JP | 5-93325 U | 12/1993 |
| JP | 8-89088 | 4/1996 |
| JP | 3032651 U | 12/1996 |
| JP | 09-131137 A | 5/1997 |
| JP | 10-113081 | 5/1998 |
| JP | 10-164990 A | 6/1998 |
| JP | 10-327690 | 12/1998 |
| JP | 2001-61350 | 3/2001 |
| JP | 2002-101755 | 4/2002 |
| JP | 2003-174825 | 6/2003 |
| JP | 2004-337073 A | 12/2004 |

OTHER PUBLICATIONS

International Search Report mailed Dec. 26, 2006 issued in PCT/JP2006/323640.

Notification of Transmittal of Translation of the International Preliminary Report on Patentability mailed Jun. 12, 2008; and an International Preliminary Report on Patentability including a Written Opinion of the International Searching Authority issued Jun. 3, 2008.

Japanese Office Action issued on Jan. 24, 2013 in Japanese Application No. 2007-547931.

* cited by examiner

PLANT CULTIVATING UNIT AND PLANT CULTIVATING CONTAINER

CROSS REFERENCE TO RELATED APPLICATIONS:

This application is the National Stage of International Application No. PCT/JP2006/323640, filed Nov. 28, 2006, and claims benefit of Japanese Application No. 2005-345984, filed Nov. 30, 2005, both of which are herein incorporated by reference in their entirety.

TECHNICAL FIELD

The present invention relates to a plant cultivating unit comprising a water storage tray in which receivers for housing the roots of plants can be arranged in an interior thereof and in which water can be stored, wherein a water storage space in the water storage tray and the receivers are communicated via water feeders, and the water stored in the water storage tray can be supplied to the plants via the water feeders.

BACKGROUND ART

An environmental problem characteristic of urban areas (Tokyo, Osaka, Nagoya, and other cities), known as the heat island phenomenon (a phenomenon in which the atmospheric temperature of an urban area is higher than in the suburbs with an islandlike form), is currently posing considerable problems with more hot nights, localized concentrated rainfalls, and other various such effects on the lives of urban residents.

To provide better countermeasures against the heat island phenomenon, the Japanese government has established the Ministerial Liaison Committee on Heat Island Countermeasures and has instituted a series of heat island countermeasures.

One of the series of countermeasures to the heat island phenomenon is to promote the greening on the site of private buildings etc., and on the rooftops of government facilities and the like. This is promoted by modifying fixed property taxes, providing subsidies, and the like. The objective is "to improve the covering of the earth's surface in order to prevent the reduction in evapotranspiration and the heating up of the earth's surface due to a reduction in green space and water surfaces, and a greater coverage of ground areas by buildings, pavements, and the like."

On the other hand, one example of a method commonly implemented in order to introduce such greening countermeasures is to place planters that house suitable soil (light soil in the case of rooftops) on land sites and rooftops, and to cultivate plants in these planters. Also known is a method in which a plant cultivating apparatus (see Patent Document 1) capable of constant automatic water supply is used as a planter in which plants are grown.

Patent Document 1: Japanese Laid-open Patent Application No. 10-113081

DISCLOSURE OF THE INVENTION

Problems that the Invention is Intended to Solve

However, in conventional methods for preparing a plurality of planters to cultivate plants, land sites and rooftops with larger surface areas require more planters (specifically, a greater number of plants) to be prepared, and watering them requires a great amount of labor. For example, the leaves of some cultivated plants may be scorched or fall off if the amount of moisture is even slightly insufficient. If the amount of moisture is insufficient to an even greater degree, the plants may wither. Conversely, if the soil contains too much moisture, the roots will have insufficient oxygen, which may cause the roots to rot. Therefore, watering (water management) is often assigned to landscapers, and problems with high labor costs and the like have been encountered.

In view of this, a plant cultivating device that does not require manual labor and that can automatically perform these complicated watering jobs has been proposed, as disclosed in Patent Document 1. This plant cultivating apparatus is configured from a water storage container that can contain a planter, and an automatic watering device to which water feeding tubes are connected. Constant water levels in the water storage container can be maintained by the automatic watering device. However, this plant cultivating device requires separate water supply piping work for supplying water to the water storage container, and is therefore not easily constructed and can lead to increased equipment costs.

To simplify this water supply piping work, Patent Document 1 states that it is possible to achieve a configuration in which water storage containers are communicated with each other, and an automatic watering device is provided to only one of these water storage containers. However, to improve water drainage, for example the floor surface of a rooftop is often sloped so that the center of the floor surface slightly rises upward. Therefore, even assuming that the water storage containers are arranged on the rooftop surface and water is uniformly supplied to the containers, it is difficult to maintain constant water levels in the water storage containers because the floor surface is not flat (for example, in cases in which the center of the floor surface has a slope that rises slightly, water storage containers nearer to the center of the floor surface have lower water levels), and the water supply may be irregular between water storage containers, which may be a hindrance to plant growth.

The present invention was devised in view of these circumstances, and provides a plant cultivating unit that provides easier watering job, and that does not require separate water supply piping work and can supply water uniformly to plants in a location where the floor surface is sloped such as the rooftop of a building.

Means for Solving Problems

A first aspect of the present invention is a plant cultivating unit comprising a water storage tray in which water can be stored and in which at least one receiver for housing the roots of plants can be arranged in an interior thereof, a water storage space in the water storage tray and the receiver being communicated via at least one water feeder, and the water stored in the water storage space being able to be supplied to the plants via the water feeder; the plant cultivating unit being characterized in comprising: connectors provided to the water storage tray and capable of communicably connecting adjacent water storage trays to each other, the connectors being configured from at least one inflow connector and at least one outflow connector, the water flowing in through the inflow connector to the water storage space, and the water being able to flow out through the outflow connector by an overflow when a specific amount of water is stored in the water storage space.

[Function and Effect]

Since the water storage tray provided to the plant cultivating unit of the present invention has connectors (an inflow connector and an outflow connector) capable of communicably connecting adjacent water storage trays to each other, a plurality of the plant cultivating units of the present invention can be connected to each other. Therefore, when the plant cultivating unit of the present invention is set up on a site of a building or a rooftop to promote greening, the number of units and their manner of connection can be appropriately adjusted to the greening that matches the size and shape of the building site or rooftop, the presence of a passageway therein, and various other facility conditions.

Another aspect is that the water supplied to the plant cultivating unit of the present invention flows through the inflow connector into the water storage space in the water storage tray, and when a specific amount of water is stored in the water storage space, the water flows out through the outflow connector by an overflow. The water (hereinafter referred to as stored water) stored in the water storage space is then supplied to the plants via water feeders that communicate the water storage space with receivers for housing the roots of the plants.

Therefore, the plant cultivating unit of the present invention does not require installing separate water supply piping. A plurality of plant cultivating units is communicably connected via connectors as described above, and if water is supplied to one of these plant cultivating units, the water can be automatically supplied (stored) to all of the other plant cultivating units (water storage trays) by overflowing, and the water (stored water) stored in the water storage trays can be supplied via the water feeders to the plants housed in the receivers.

Furthermore, setting the connectors (the inflow connector and the outflow connector) to a suitable height in the water storage tray makes it possible to adjust the water level of the stored water (the amount of stored water). Therefore, it is possible to constantly supply an appropriate amount of water in accordance with the plants being cultivated, and an appropriate watering operation can be automatically performed. Moreover, since water is supplied to the water storage trays of other plant cultivating units by an overflow, it is possible to always maintain a constant water level in the water storage trays regardless of the conditions existing at the location of the facility (for example, a sloped floor surface such as that of a building rooftop, or the like). As a result, irregularity in water supply between plant cultivating units can be prevented.

In a second aspect of the present invention, the receiver has a concave shape, a bottom part thereof is provided with a through hole that can function as the water feeder, and the bottom part is positioned below the maximum water level possible when water is stored in the water storage space.

[Function and Effect]

Since the receiver has a concave shape, the plants can be easily housed and fixed therein. Furthermore, since the bottom part of the receiver is provided with a through hole that can function as the water feeder, and the bottom part is positioned below the maximum water level possible when water is stored in the water storage space, if the water storage space is totally filled with water, by constantly maintaining the water storage space being overflowed, the water can enter the receiver via the through hole, and water can be reliably supplied to the plants. Therefore, the present invention can be applied to hydroponic cultures.

In a third aspect of the present invention, a plurality of the receivers is provided to the water storage tray, and a raised tray bottom is formed between the receivers.

[Function and Effect]

Since a plurality of receivers is provided to the water storage tray, a plurality of plants can be cultivated simultaneously in one plant cultivating unit. Furthermore, since a raised tray bottom is formed between the receivers, the water used can be conserved by providing the minimum necessary water storage space.

In a fourth aspect of the present invention, a cover for covering the top of the water storage tray is provided.

[Function and Effect]

Since a cover for covering the top of the water storage tray is provided, the light-blocking effect can prevent algae from forming in the stored water, and debris can be prevented from being admixed with the stored water. As a result, the stored water is not likely to be contaminated, and it is possible to prevent clogging and other problems in the connectors through which water flows. Furthermore, the heat insulating effect of the plant cultivating unit of the present invention can be further increased by the cover, severe temperature fluctuations of the stored water can be prevented, and better growth of the plants can be promoted. Furthermore, evaporation of the stored water can be reduced, and a water conservation effect can be anticipated.

In a fifth aspect of the present invention, the receivers and the cover constitute an integrally molded component, and the integrally molded component and the water storage tray are configured to be detachable.

[Function and Effect]

Since the receivers and the cover constitute an integrally molded component, and the integrally molded component and the water storage tray are configured to be detachable, it is possible, for example, to detach and clean the integrally molded component and the water storage tray separately, making the maintenance easy. Moreover, since the integrally molded component can also be used as a transporting tray or replacement tray, in cases in which, for example, there are plant cultivating units having withered plants among the plurality of plant cultivating units, the integrally molded components that house the withered plants are removed as a whole from their plant cultivating units. Replacing these components with other integrally molded components that house healthy plants allows the plants to be replaced in a simple manner without dirtying one's hands by the soil or the like.

In a sixth aspect of the present invention, the integrally molded component has a float portion that can float on a water surface.

[Function and Effect]

Since the integrally molded component has a float portion that can float on a water surface, the integrally molded component that houses plants can be floated as it is in a suitable water tank (for example, a pond or the like in a garden), a pond, river, lake, or the like to cultivate the plants without using the water storage tray. Since a space in which air is sealed is formed by the float portion, the heat insulating effect of the integrally molded component can be further improved.

In a seventh aspect of the present invention, the plant cultivating unit is manufactured by blow molding.

[Function and Effect]

Manufacturing by blow molding makes it possible to reduce manufacturing costs and to simplify manufacture in comparison with manufacturing by injection molding. A blow molding technique is particularly preferable for molding the connectors because a pipe structure can be easily molded.

In an eighth aspect of the present invention, the float portion is formed into a hollow shape, an opening is provided for communicating the internal space in the float portion with the outside, and a lid member for closing off the opening is detachably provided.

[Function and Effect]

In cases in which the plant cultivating unit is used while installed on a floor surface, the integrally molded component provided with the float portion can be used as a weight by pouring water, sand, or the like into the internal space in the float portion and closing off the opening with a lid member. Therefore, the integrally molded component can be prevented from being moved or overturned by wind or the like in cases in which the integrally molded component is installed on a rooftop or the like. Since the lid member can be removed to empty out the water, sand, or the like that has been poured in through the opening, the integrally molded component can be easily carried while used as a weight.

The integrally molded component can be used while being floated on a pond, river, lake, or the like. This can be achieved merely by filling the internal space in the float portion with air and closing off the opening with the lid member.

Therefore, the internal space in the float portion can be efficiently used to improve convenience, both in cases in which the plant cultivating unit is used while installed on a floor surface, and in cases in which the integrally molded component is used while being floated on a pond, river, lake, or the like.

In a ninth aspect of the present invention, the cover is provided with connecting parts capable of connecting adjacent covers together in a state in which a plurality of covers is aligned laterally; at least one connecting part provided on one side and at least one connecting part provided on the other side are disposed in different vertical positions; and the covers can be connected together in a state in which the connecting parts of laterally adjacent covers vertically overlap each other.

[Function and Effect]

Laterally adjacent covers can be connected by the connecting parts, and a plurality of covers can be used while being integrally connected. The laterally adjacent covers can be connected merely by the vertical overlapping of the connecting parts, and the connecting operation can be simplified. Since the connecting part on one lateral side and the connecting part on the other lateral side are arranged at different vertical positions, the connecting part on one lateral side is overlapped above the connecting part of an adjacent cover, and the connecting part on the other lateral side is overlapped below the connecting part of an adjacent cover to connect the covers together, whereby the positions of the covers can be vertically aligned.

In cases in which integrally molded components that have receivers and covers are used while being floated on a pond, river, lake, or the like, the positions of the integrally molded components can be vertically aligned to connect a plurality of integrally molded components and to float the plurality of integrally molded components as a single whole. This is particularly useful in cases in which integrally molded components are used while being floated on a pond, river, lake, or the like.

In a tenth aspect of the present invention, mounting parts capable of being mounted on a wall are provided.

[Function and Effect]

Since the plant cultivating unit of the present invention comprises mounting parts that can be mounted on a wall, not only the greening on the floor surface (horizontal direction) of a site of a building or a rooftop, but also the greening on the wall surfaces (vertical direction) becomes possible.

In an eleventh aspect of the present invention, a protective cover member is provided to cover the outer surface of the plant cultivating unit in the tenth aspect.

[Function and Effect]

Since the outer surface of the plant cultivating unit is covered by a protective cover member, the plant cultivating unit can be provided with better resistance against outdoor weather conditions (ultraviolet rays, heat, rainstorms, etc.).

The twelfth aspect of the present invention is a plant cultivating container comprising at least one receiver for housing the roots of plants, and at least one water feeder communicated with the receiver to allow water to be supplied to the plants via the water feeder; the plant cultivating container further comprising: a through hole that can function as the water feeder and is provided to a bottom part of the receiver, at least one float portion capable of floating on a water surface, and the bottom part of the receiver being positioned below the water surface in a state in which the plant cultivating container is floated on the water surface by the float portion.

[Function and Effect]

In cases in which the plant cultivating container is used while installed on a floor surface such as a building rooftop, a water storage tray or another such water storing member capable of storing water is installed on the floor surface, and the plant cultivating container can be mounted on the water storing member so that the water storage space for storing water in the water storing member and the receiver are communicated via the through hole. In this case, the water stored in the water storing member is supplied to the roots of the plants housed in the receiver via the through hole provided in the bottom part of the receiver. Therefore, the plant cultivating container can be installed on a floor surface such as a building rooftop to cultivate plants.

Since the plant cultivating container comprises a float portion, when the plant cultivating container is floated on a pond, river, lake, or the like, the container is floated by the buoyancy of the float portion in such way that the bottom part of the receiver is positioned below the water surface of the pond, river, lake, or the like. In this case, the water in the pond, river, lake, or the like is supplied to the roots of the plants housed in the receiver via the through hole provided in the bottom part of the receiver. Therefore, the plant cultivating container can be floated on a pond, river, lake, or the like to cultivate plants.

Thus, according to the plant cultivating container having the receiver and the float portion, it is possible to use one plant cultivating container both in cases in which the container is used while installed on a floor surface such as a building rooftop, and in cases in which the container is used while being floated on a pond, river, lake, or the like. Therefore, the applicable range of the plant cultivating container can be expanded, and the convenience can be improved.

Incidentally, the conventional plant cultivating containers have been either floor-surface models that are exclusively used while installed on a floor surface such as a building rooftop, or floating models that are exclusively used while being floated on a pond, river, lake, or the like. A plant cultivating container designed exclusively to be installed on a floor surface cannot be used while being floated on a pond, river, lake, or the like. Conversely, a plant cultivating container designed exclusively for floating applications cannot be used while installed on a floor surface such as a building rooftop. Therefore, conventional plant cultivating containers have had a limited range of applicability and have been inconvenient.

In a thirteenth aspect of the present invention, the edge of a main unit of the plant cultivating container in the twelfth aspect is positioned below the bottom surface of the receiver.

[Function and Effect]

Since the edge of the main unit of the plant cultivating container is positioned below the bottom part of the receiver, a space can be formed below the bottom part of the receiver. In cases in which the plant cultivating container is used while installed on a floor surface, the water storage tray or other water storing member can be disposed in this lower space. Therefore, the plant cultivating container can be installed in a compact manner. Furthermore, air ventilation and water drainage can be improved because the lower space can be used for air ventilation and water drainage.

Since the float portion can be provided up to the edge of the container main unit, which is at a position below the bottom part of the receiver, the buoyancy obtained by the float portion can be further increased. Therefore, in cases in which the plant cultivating container is used while being floated on a pond, river, lake, or the like, it is possible to prevent the plants housed in the receiver from sinking too much in the water at the pond, river, lake, or the like, and the plants can be cultivated satisfactorily. Furthermore, since the section up to the edge of the container main unit can be utilized, the buoyancy obtained by the float portion can be adjusted by adjusting the size of the float portion, and the amount of water supplied to the plants can be adjusted to the appropriate amount.

In a fourteenth aspect of the present invention, the float portion is formed into a hollow shape, an opening is provided for communicating the internal space in the float portion with the outside, and a lid member for closing off the opening is detachably provided.

[Function and Effect]

In cases in which the plant cultivating container is used while installed on a floor surface, the container main unit can be used as a weight by pouring water, sand, or the like into the internal space in the float portion and closing off the opening with a lid member. Therefore, the plant cultivating container can be prevented from being moved or overturned by wind or the like in cases in which the plant cultivating container is installed on a rooftop or the like. Since the lid member can be removed to empty out the water, sand, or the like that has been poured in through the opening, the plant cultivating container can be easily carried while the container main unit is used as a weight.

The plant cultivating container can be used while being floated on a pond, river, lake, or the like by merely filling the internal space in the float portion with air and closing off the opening with the lid member.

Therefore, the internal space in the float portion can be efficiently used to improve convenience, both in cases in which [the plant cultivating container] is used while installed on a floor surface, and in cases in which the [plant cultivating container] is used while being floated on a pond, river, lake, or the like.

In a fifteenth aspect of the present invention, the main unit of the plant cultivating container in any of the twelfth through fourteenth aspects is provided with connecting parts capable of connecting adjacent container main units together in a state in which a plurality of container main units of the plant cultivating containers is aligned laterally, at least one connecting part provided on one side and at least one connecting part provided on the other side are disposed in different vertical positions, and the container main units can be connected together in a state in which the connecting parts of the laterally adjacent container main units vertically overlap each other.

[Function and Effect]

In cases in which the plant cultivating container is used while being floated on a pond, river, lake, or the like, the laterally adjacent container main units can be connected by the connecting parts, and a plurality of plant cultivating containers can be used while being integrally floated. The laterally adjacent container main units can be connected merely by vertically overlapping the connecting parts, and the connecting operation can be simplified. Since the connecting part on one lateral side and the connecting part on the other lateral side are arranged at different vertical positions, the connecting part in one lateral side is overlapped above the connecting part of an adjacent container main unit, and the connecting part on the other lateral side is overlapped below the connecting part of an adjacent container main unit to connect the container main units together, whereby the positions of the container main units can be vertically aligned.

KEY

Figure 1:
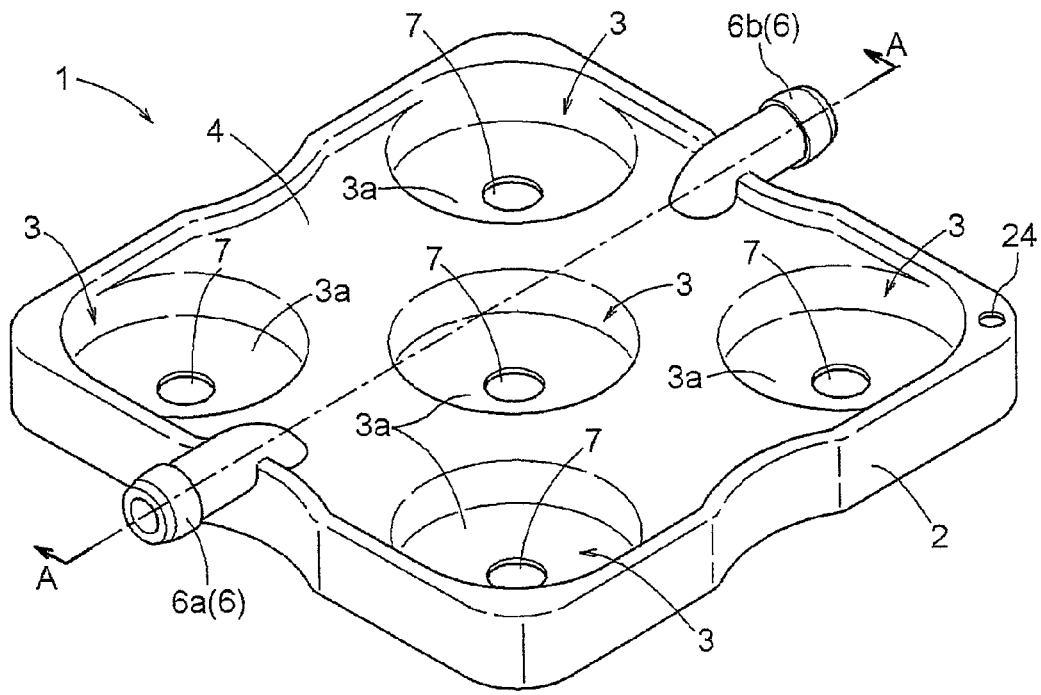
FIG. 1 is an external perspective view of the front side of the plant cultivating unit according to a first embodiment of the present invention.

1 Plant cultivating unit
2 Water storage tray
2a Raised-up tray bottom part
3 Receiver
3a Bottom part
4 Cover
5 Cultivating bottom layer
6 Connecting nozzle
6a Inflow connecting nozzle
6b Outflow connecting nozzle
7 Through hole
8 Water storage space
9 Stored water
10 Mounting part
10a Water intake hole
11 Connecting parts
11a Hole
12 Connecting member
13 Float portion 14 Plant cultivating container
15 Water surface
16 Connecting hose
17 Mounting part
17a Mounting convexity
17b Mounting concavity
18 Wall surface
19 Main mounting fixture
20 Protective cover mounting fixture
21 Protective cover member
21a Opening
21b Locking part
22 Locked part
23 Bolt hole
24 Air vent
25 Two-layer wall
26 First fitting part
27 Second fitting part
27a Convex part
28 Opening
29 Lid member

BEST MODE FOR CARRYING OUT THE INVENTION

Embodiments of the present invention are described below with reference to the drawings.

[First Embodiment]

Figure 2:
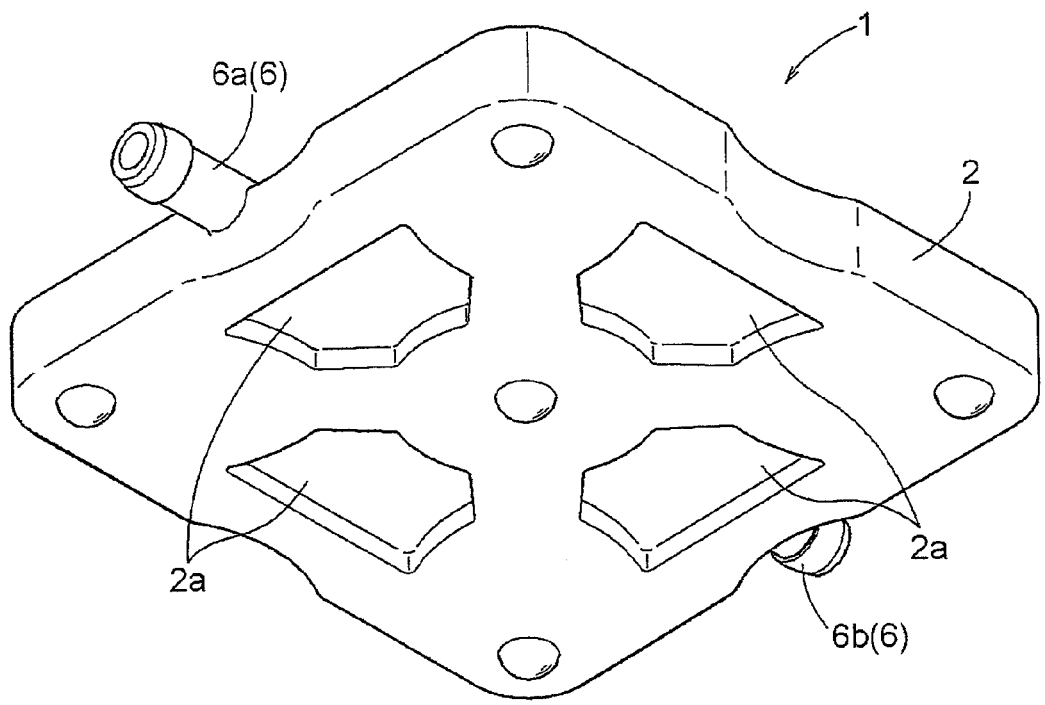
FIG. 2 is an external perspective view of the reverse side of the plant cultivating unit according to the first embodiment of the present invention.

FIGS. 1 and 2 show a first embodiment of a plant cultivating unit 1 of the present invention (FIG. 1 shows the front side, and FIG. 2 shows the reverse side). The plant cultivating unit 1 is configured from a water storage tray 2 capable of storing water for watering plants P, a plurality of circular receivers 3 that can house a cultivating bottom layer 5 capable of sustaining the plants P, and a cover 4 that covers the top of the water storage tray 2. Raised-up bottom parts 2a are also formed between the receivers 3 in the water storage tray 2, as shown in FIG. 2.

Figure 3:
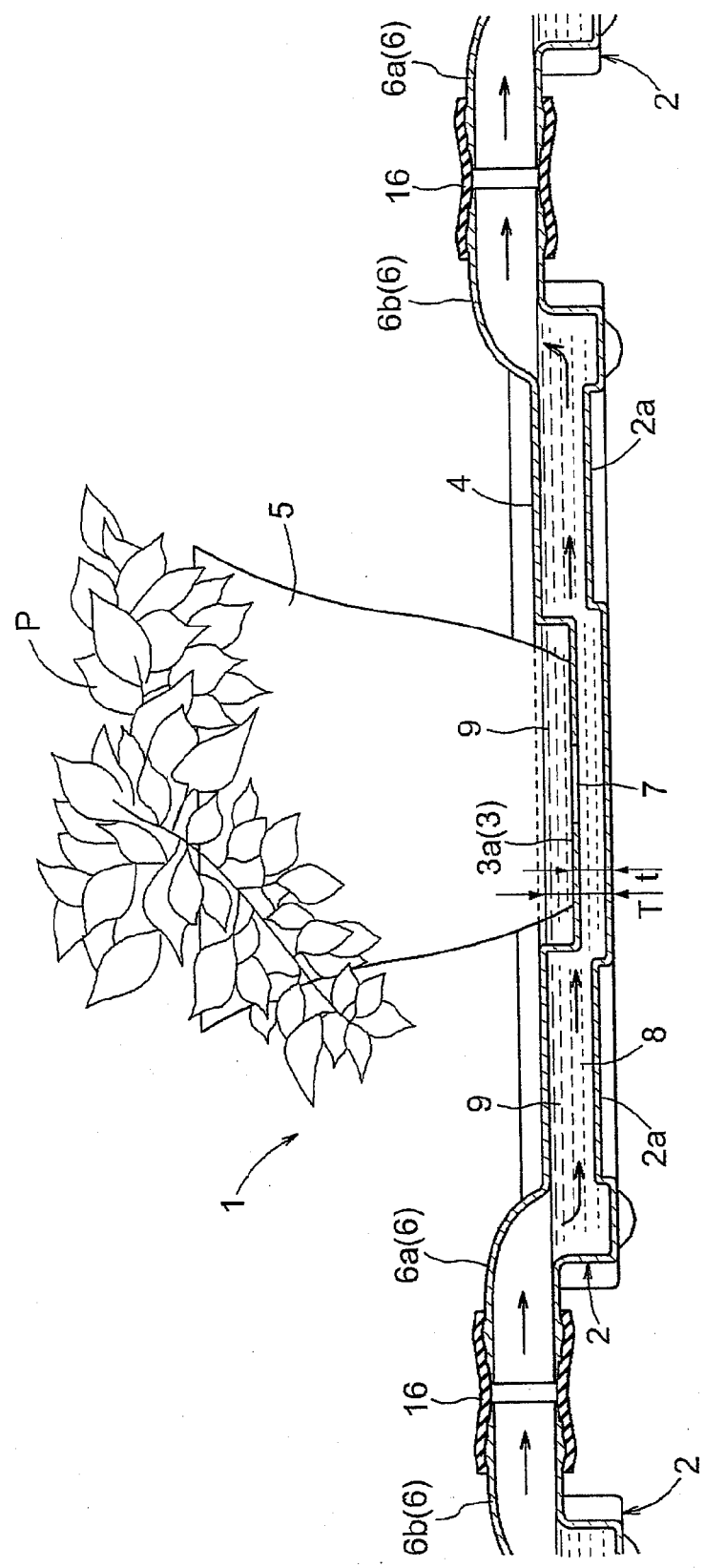
FIG. 3 is a cross-sectional view of the plant cultivating unit according to the first embodiment of the present invention.

FIG. 3 is a schematic depiction of the cross section of the plant cultivating unit 1 indicated by arrow line A in FIG. 1 in a state in which the cultivating bottom layer 5 is housed in the receivers 3.

Possible examples of the cultivating bottom layer 5 include plant pots, planters, or the like that are filled with suitable planting soil and that have holes in the bottom, or planting soil that is used alone as the cultivating bottom layer. The cultivating bottom layer is not limited to these options alone, and any layer is acceptable as long as at least water can be filled from the bottom, and the roots of plants can be housed therein in a state that allows the roots to absorb the inflowing water. The planting soil may be any solid medium that allows plants to be gardened and cultivated. Possible examples of planting soil include amber soil, Kanuma soil, leaf mold, peat moss, bog moss, and other natural planting soils; vermiculite, pearlite, urethane resins, phenol resins, and other foamed resin materials; and rock wool, hydroponic pellets, and other artificial planting soils. The shape thereof is not limited to the examples given in the drawings, and other possibilities that can be appropriately used include blocks, sandy forms, grains, bulk shapes, and other various shapes. In cases in which the medium used has the shape of sand, grains, a bulk configuration, or the like, the medium can be placed into a reticular bag or the like from which the medium will not leak out.

Each of the water storage trays 2 is provided with two connecting nozzles 6 (connectors) that are capable of communicably connecting adjacent water storage trays 2 to each other, and the connecting nozzles 6 are further distinguished as an inflow connecting nozzle 6a (inflow connector) and an outflow connecting nozzle 6b (outflow connector) according to the direction in which water flows.

The inflow connecting nozzle 6a and the outflow connecting nozzle 6b of another water storage tray 2 have a configuration in which the nozzles can be detachably and communicably connected via a connecting hose 16, and water can flow from one water storage tray 2 to another water storage tray 2 via the connecting hose 16, as shown in FIG. 3. Therefore, if the inflow connecting nozzle 6a of one water storage tray 2 and the outflow connecting nozzle 6b of another water storage tray 2 are repeatedly connected via the connecting hose 16, an arbitrary number of water storage trays 2 can be communicably connected as necessary, and water can be supplied to all of the water storage trays 2 that are communicably connected to each other in this manner.

The arrows in FIG. 3 indicate the direction in which water flows, and the water flowing in through the inflow connecting nozzle 6a is stored in a water storage space 8 in the water storage tray 2. The term "water storage space 8" refers to the maximum space capable of storing water, located from the lowest part of the internal peripheral surface of the connecting nozzle 6 to the bottom surface of the water storage tray 2. Upon filling up the water storage space 8, the stored water 9 overflows through the outflow connecting nozzle 6b. The bottom parts 3a of the receivers 3 are provided with through holes 7 (water feeders) that communicate with the water storage space 8, and these bottom parts 3a are configured to be at a position t that is lower than the lowest part (specifically, the maximum water level T of the stored water 9 that can be achieved when the water storage space 8 is filled with water) of the internal peripheral surface of the connecting nozzle 6.

Therefore, when water flows into the water storage space 8 and overflows, the stored water 9 gushes into the receivers 3 via the through holes 7, and water at a level that is the difference between the height (T) of the surface of the stored water 9 and the height (t) of the bottom parts 3a is constantly supplied to the receivers 3. The depth of the water storage space 8 and the depth and width of the receivers 3 can be modified to adjust the amount of water supplied to the receivers 3 and to constantly supply (watering) an amount of water that is appropriate for the cultivating conditions (the type of plants and other factors).

An air vent 24 for communicating the water storage space 8 with the outside is provided close to the outflow connecting nozzle 6b in the top surface of the cover 4. Air retained in the water storage space 8 is discharged to the outside through the air vent 24. Therefore, it is possible to prevent situations in which the outflow of water into the outflow connecting nozzle 6b by the overflow of stored water 9 is impeded by air retention. Therefore, in cases in which a plurality of water storage trays 2 is communicably connected, water can be supplied with precision to all of the water storage trays 2.

With the plant cultivating unit 1 of the present invention, a plurality of plant cultivating units 1 can, for example, be connectedly arranged in accordance with the size of the site or rooftop of the building where greening will be promoted. Among the plant cultivating units assembled in this manner, there will be one unconnected inflow connecting nozzle 6a and outflow connecting nozzle 6b each. When water is supplied through the unconnected inflow connecting nozzle 6a, the water storage trays 2 in the plant cultivating units repeatedly overflow in sequence, whereby water is supplied to all the plant cultivating units 1. When the water storage trays 2 of all the plant cultivating units are filled with water, the water flows out through the unconnected outflow connecting nozzle 6b, and this unconnected outflow connecting nozzle 6b is therefore connected to a suitable pipe or water flow channel or the like for draining. It is also possible to connect the unconnected inflow connecting nozzle 6a and outflow connecting nozzle 6b to a hose or the like, and to circulate the water while appropriately replenishing the water from the outside by using a pump.

The plant cultivating unit 1 of the present invention can be manufactured by a conventional molding technique (injection molding, blow molding, and the like are possible examples, but blow molding is preferred) from a polypropylene resin, polyethylene resin, polyethylene terephthalate (PET) resin, or other thermoplastic resin.

[Second Embodiment]

FIGS. 4 through 9 show the second embodiment of the plant cultivating unit 1 of the present invention.

Figure 4:
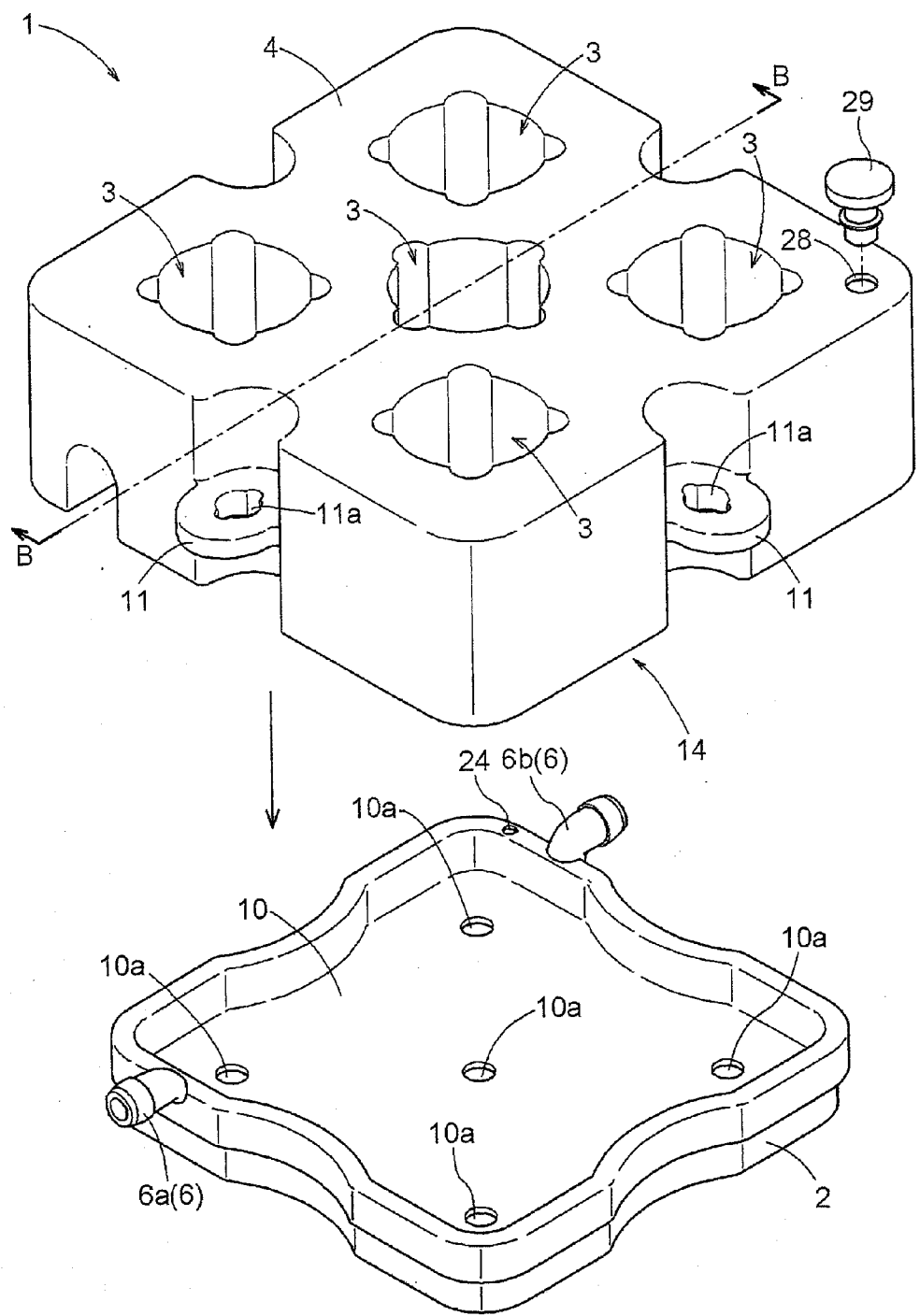
FIG. 4 is an external perspective view of the plant cultivating unit according to a second embodiment of the present invention.

As shown in FIG. 4, the plant cultivating unit 1 of the second embodiment is configured from a water storage tray 2 capable of storing water for watering plants, and an integrally molded plant cultivating container 14 (an integrally molded component in which a plurality of receivers 3 that can house a cultivating bottom layer 5 capable of sustaining plants P is molded integrally with a cover 4 for covering the top of the water storage tray 2). The water storage tray 2 and the plant cultivating container 14 can be detachably fitted together.

Figure 5:
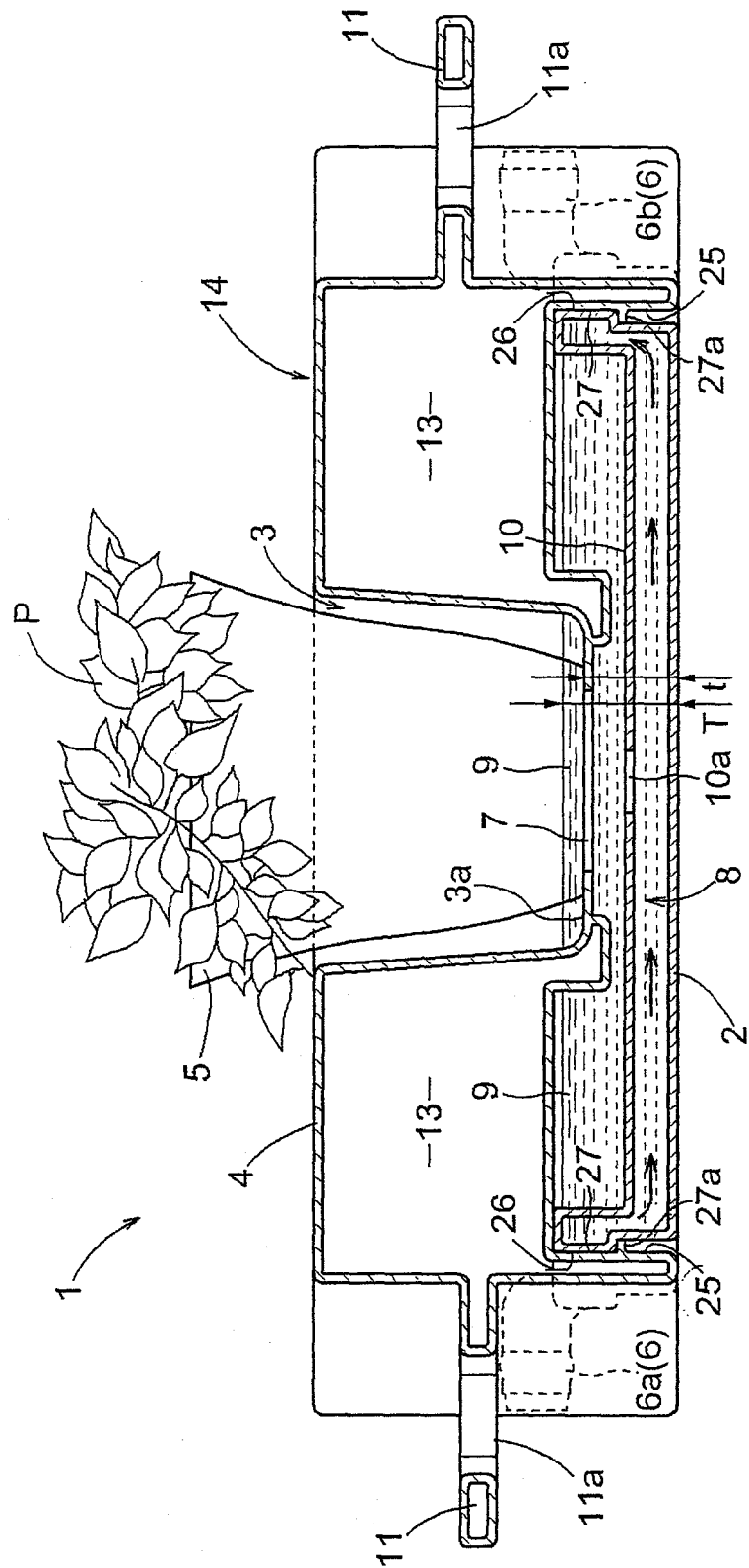
FIG. 5 is a cross-sectional view of the plant cultivating unit according to the second embodiment of the present invention.

FIG. 5 is a schematic cross section of the plant cultivating unit 1 (in a state in which the water storage tray 2 and plant cultivating container 14 are fitted together) of the second embodiment indicated by the arrow line B in FIG. 4, in a state in which the cultivating bottom layer 5 is housed in the receivers 3.

As shown in FIGS. 4 and 5, similar to the embodiment described above, the water storage tray 2 of the plant cultivating unit 1 in the second embodiment is provided with two connecting nozzles 6 (connectors) capable of communicably connecting adjacent water storage trays 2 with each other. The connecting nozzles 6 are further distinguished as an inflow connecting nozzle 6a (inflow connector) and an outflow connecting nozzle 6b (outflow connector) according to the direction in which water flows.

Furthermore, the water storage tray 2 of the second embodiment is provided with a mounting part 10 on which the plant cultivating container 14 can be mounted, and the mounting part 10 is provided with water intake holes 10a. Water that flows in through the inflow connecting nozzle 6a gushes in through the water intake holes 10a and flows out into the top of the mounting part 10, where it is stored in the water storage space 8, similar to the embodiment described above.

When stored water 9 completely fills the water storage space 8, the water overflows out through the outflow connecting nozzle 6b. Similar to the embodiment described above, through holes 7 (water feeders) that communicate with the water storage space 8 are provided to the bottom parts 3a of the receivers 3, and the bottom parts 3a are configured to be at a position t that is lower than the lowest part (specifically, the maximum water level T of the stored water 9 that can be achieved when the water storage space 8 is filled with water) of the internal peripheral surface of the connecting nozzle 6. An air vent 24 is also provided close to the outflow connecting nozzle 6b in the top surface of the water storage tray 2, similar to the embodiment described above.

Therefore, when the stored water 9 flows into the water storage space 8 and overflows, the overflowing water gushes through the water intake holes 10a and flows out to the top of the mounting part 10. This stored water 9 then gushes out into the receivers 3 via the through holes 7, and water at a level that is the difference between the height (T) of the surface of the stored water 9 and the height (t) of the bottom parts 3a is constantly supplied to the receivers 3. The depth of the water storage space 8, the height of the mounting part 10, or the depth or width of the receivers 3 can be modified to adjust the amount of water supplied to the receivers 3 and to constantly supply (fill in) an amount of water that is appropriate for the cultivating conditions (the type of plants and other factors).

The methods for connecting, using, and manufacturing a plurality of plant cultivating units 1 (water storage trays 2) in the second embodiment are the same as the methods in the embodiment described above.

As shown in FIG. 5, the plant cultivating container 14 is formed to have a concave shape with a lower side opened, by providing a two-layer wall 25 formed by folding over the sides upward from the bottom in the outer side portions of the bottom section, and by making the center portion into a raised-up bottom. The water storage tray 2 is placed in the space enclosed by the two-layer wall 25, and the entire water storage tray 2 is thereby covered by the plant cultivating container 14. Therefore, since the entire water storage space 8 in the water storage tray 2 can be covered by the plant cultivating container 14, a light-blocking effect provided by the plant cultivating container 14 can be obtained in the entire water storage space 8, and algae can be effectively prevented from forming in the stored water.

To fit the plant cultivating container 14 and the water storage tray 2 together, the water storage tray 2 is provided with a first fitting part 26, and the plant cultivating container 14 is provided with a second fitting part 27. The first fitting part 26 is formed into a convex shape wherein the upper portion protrudes outward in the external periphery of the water storage tray 2. For the second fitting part 27, a convex part 27a that protrudes inward is provided in the two-layer wall 25 of the plant cultivating container 14, and the concave part formed at the top of the convex part 27a constitutes the second fitting part 27. The first fitting part 26 and the second fitting part 27 are fitted together to mount the plant cultivating container 14 in the water storage tray 2.

Since the convex part 27a in the second fitting part 27 is provided to the two-layer wall 25 of the plant cultivating container 14, the second fitting part 27 is provided to a portion of the plant cultivating container 14 having increased rigidity. Therefore, it is difficult to separate the first fitting part 26 and the second fitting part 27, and the plant cultivating container 14 can be easily mounted with precision in the water storage tray 2.

The interior of the plant cultivating container 14 is molded into a hollow shape, and an opening 28 is provided to communicate this internal space with the exterior. A lid member 29 for closing up the opening 28 is detachably provided to the opening 28. The plant cultivating container 14 can be used as a weight by removing the lid member 29 and then pouring water, sand, or the like through the opening 28 into the internal space in the plant cultivating container 14, and attaching the lid member 29. Therefore, the plant cultivating container 14 can be prevented from moving or overturning due to wind or the like, even in cases in which the plant cultivating container 14 is set up on a rooftop or the like. When the plant cultivating container 14 is carried, the lid member 29 can be removed to release the water, sand, or the like that has been poured in through the opening 28, thereby making the plant cultivating container 14 easy to carry.

Figure 6:
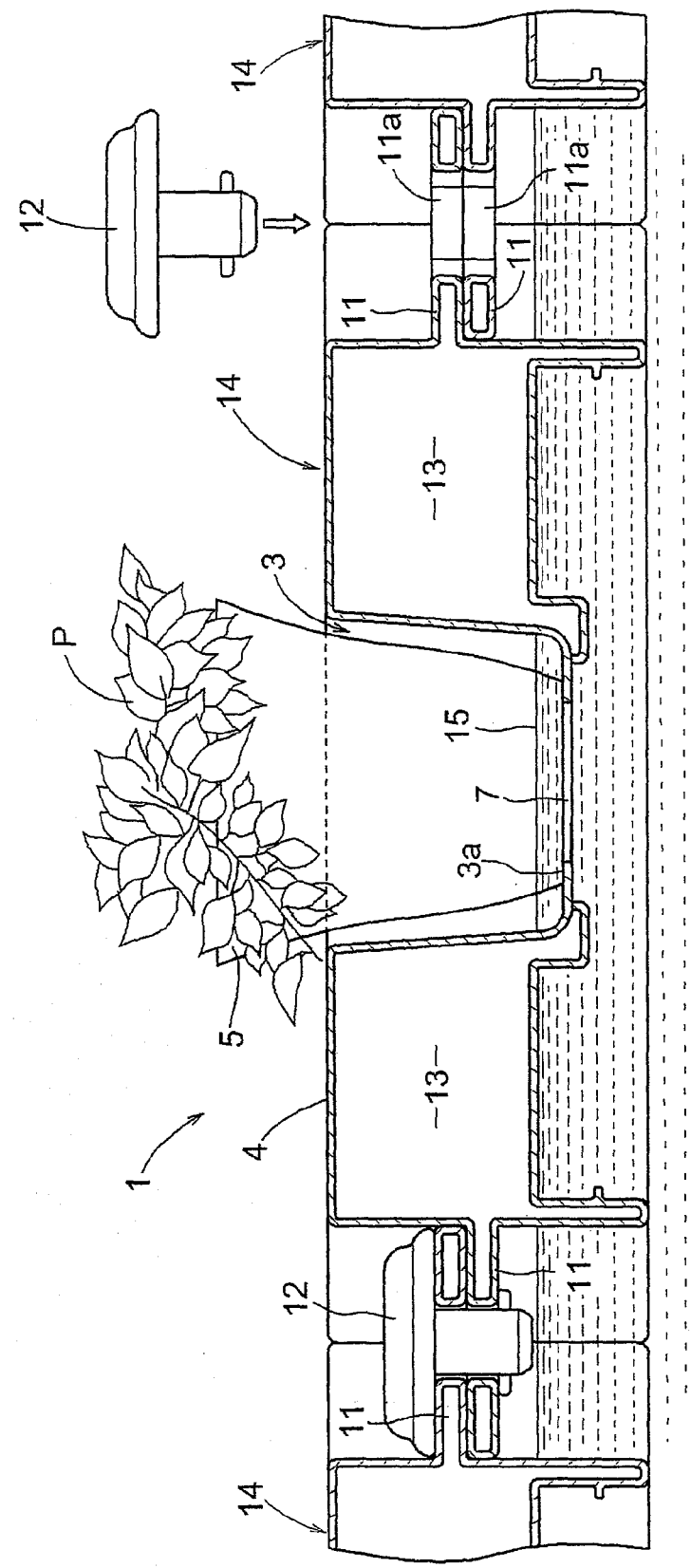
FIG. 6 is a cross-sectional view of the plant cultivating unit according to the second embodiment of the present invention.

Another possibility is a configuration wherein a float portion 13 (a space in which air is sealed) that can provide buoyancy is provided to the plant cultivating container 14 as shown in FIG. 6, and the plant cultivating container 14 can float on a water surface 15 of a pond, river, lake, or the like.

The buoyancy of the plant cultivating container 14 can be adjusted so that the bottom parts 3a of the receivers 3 are lower than the water surface 15 in a state in which the cultivating bottom layer 5 is housed in the receivers 3, and the amount of water supplied to the receivers 3 can be adjusted by adjusting the buoyancy.

The plant cultivating container 14 is configured as an integrally molded component having the receivers 3 and the float portion 13. The float portion 13 is configured so as to enable the plant cultivating container 14 to float in a manner in which the bottom parts 3a of the receivers 3 are lower than the water surface 15 of a pond, river, lake, or the like. Specifically, the internal space in the hollow plant cultivating container 14 is filled with air and the opening 28 is closed up with the lid member 29, thereby forming the float portion 13 in the plant cultivating container 14.

The plant cultivating container 14 is formed into a concave shape wherein the center portions containing the receivers 3 are formed as raised-up bottoms and the lower side is opened. The plant cultivating container 14 is configured so that the edge of the container main unit is lower than the bottom parts 3a of the receivers 3. The float portion 13 can be formed at a lower position than the bottom parts 3a of the receivers 3 by forming the float portion 13 around the peripheries of the receivers 3. Therefore, the buoyancy obtained in the float portion 13 can be further increased, and it is possible to prevent the bottom parts 3a of the receivers 3 from sinking too much below the water surface 15 of a pond, river, lake, or the like; and to prevent an excessively large amount of water from being supplied to the plants P.

Thus, the plant cultivating unit 1 can be used while being floated in a pond, river, lake, or the like. In this case, the plant cultivating container 14 is provided with connecting parts 11 so that adjacent plant cultivating containers 14 can be connected to each other, and the connecting parts 11 have holes 11a. When [plant cultivating containers 14] are connected, the mutual connecting parts 11 of adjacent plant cultivating container 14 are overlapped, the positions of the holes 11a are aligned, and suitable connecting members 12 (bolts or the like) capable of passing through the two overlapping holes 11a can be fitted through to connect [the plant cultivating containers 14] together.

The connecting parts 11 are provided to the cover 4 and are disposed in the centers of the four sides of the plant cultivating container 14, which is formed into a rectangular shape as seen in a plan view. The connecting parts 11 are configured so that a connecting part 11 provided on one side and a connecting part 11 provided on the other side are arranged respectively at different vertical positions, and plant cultivating containers 14 can be connected to each other in a state in which the connecting parts 11 of laterally (horizontally) adjacent plant cultivating containers 14 vertically overlap each other, as shown in FIG. 6. When the laterally (horizontally) adjacent plant cultivating containers 14 are connected, the connecting parts 11 on one lateral (horizontal) side (the top side in FIG. 6) are overlapped so that the connecting part 11 of one plant cultivating container 14 is higher than the connecting part 11 of the adjacent plant cultivating container 14. On the other lateral (horizontal) side (the bottom side in FIG. 6), the connecting part 11 is overlapped so as to be below the connecting part 11 of the adjacent plant cultivating container 14, and the plant cultivating containers 14 are connected together, thereby aligning the positions of the plant cultivating containers 14 in the vertical direction.

The connecting parts 11 are provided so as to extend horizontally out from portions that are concaved inward in the outer sides of the plant cultivating container 14. When laterally (horizontally) adjacent plant cultivating containers 14 are connected, the container main units of the plant cultivating containers 14 are connected to each other in a state of contact by overlapping the connecting parts 11. Therefore, the buoyancy of the float portions 13 provided to each of a plurality of plant cultivating containers 14 can cooperate to collectively float the plurality of plant cultivating containers 14. In the main unit of the plant cultivating container 14, the top surface or bottom surface of a connecting part 11 provided on one side is arranged at approximately the same height as the bottom surface or top surface of the connecting part 11 provided on the other side. Therefore, the plant cultivating containers 14 can be connected together in a state in which their container main units are in contact while the vertical positions of the plant cultivating containers 14 are aligned.

Figure 7:
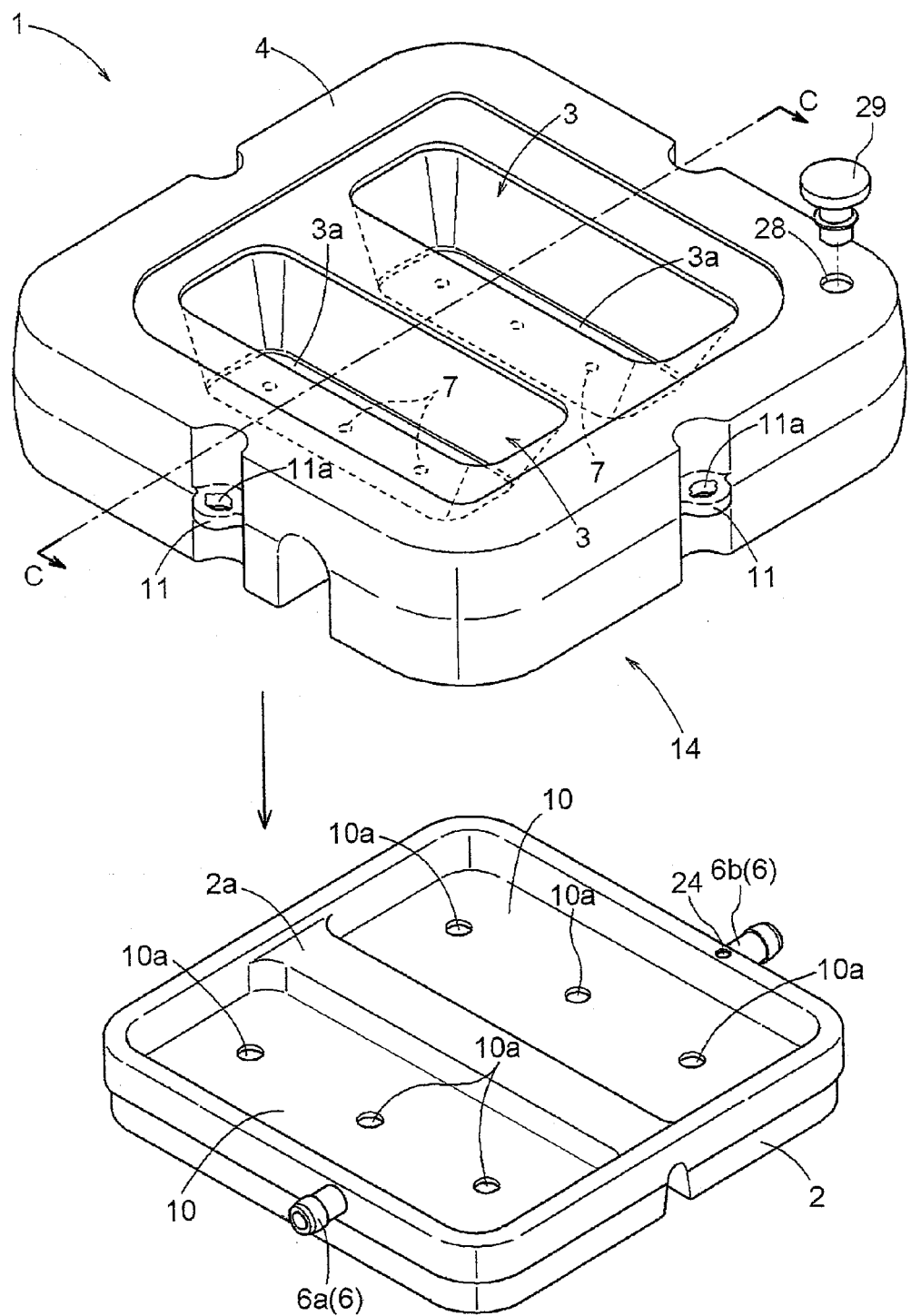
FIG. 7 is an external perspective view of the plant cultivating unit according to the second embodiment (another aspect) of the present invention.
Figure 8:
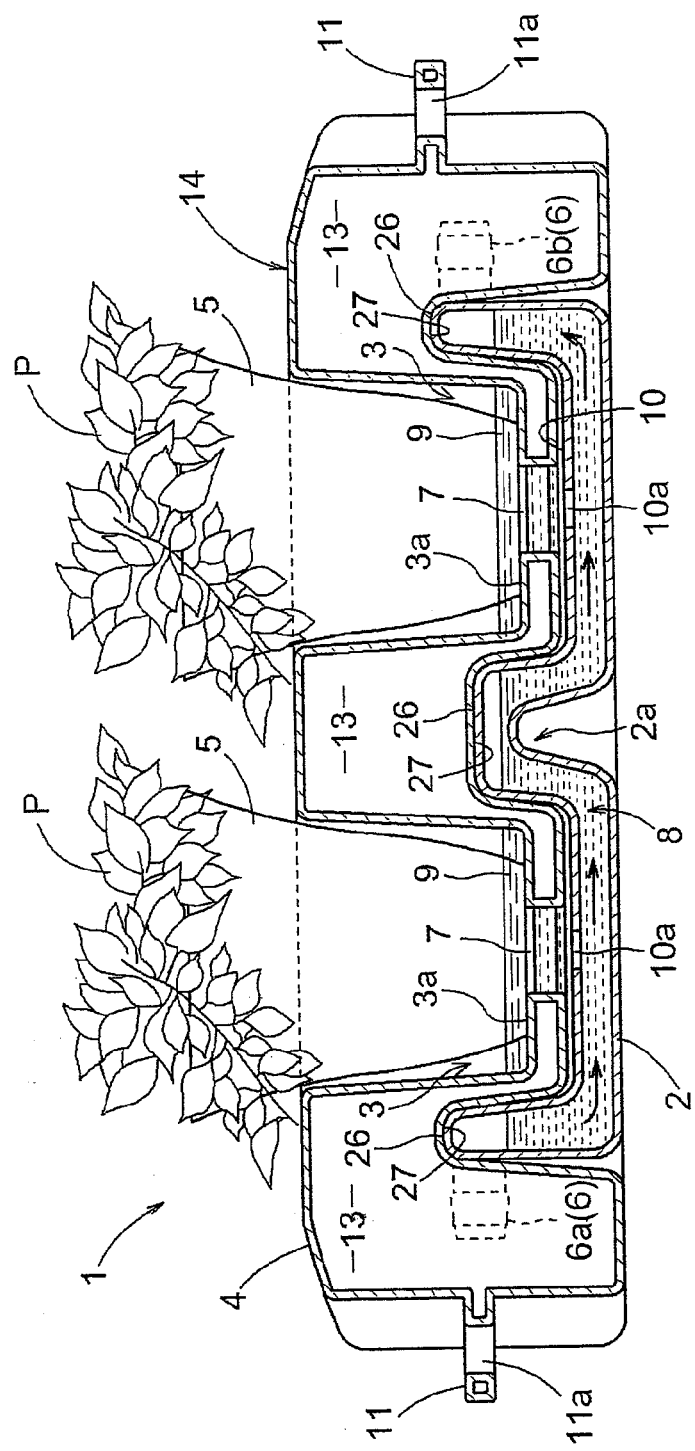
FIG. 8 is a cross-sectional view of the plant cultivating unit according to the second embodiment (another aspect) of the present invention.
Figure 9:
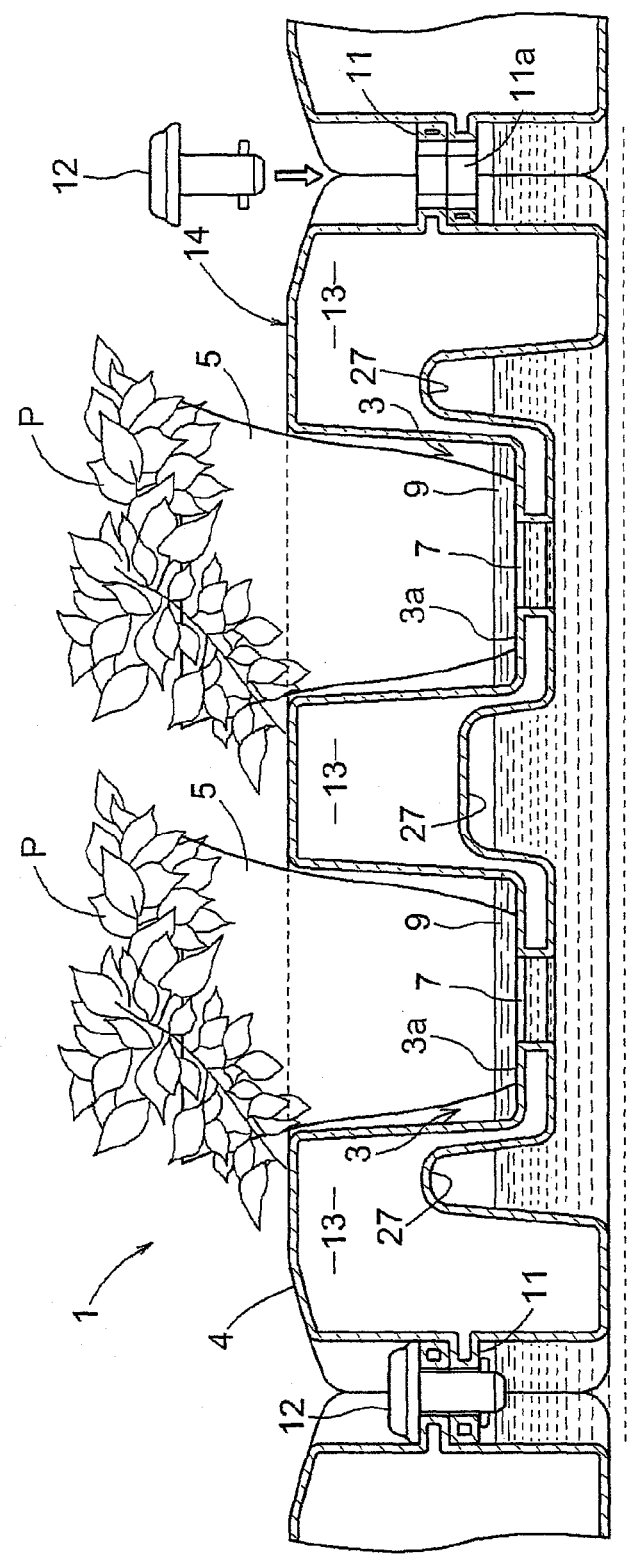
FIG. 9 is a cross-sectional view of the plant cultivating container according to the second embodiment (another aspect) of the present invention.

FIGS. 7 through 9 show another aspect of the second embodiment. Specifically, the plant cultivating container 14 of the other aspect has a configuration wherein the receivers 3 have greater width as shown in FIG. 7, and the bottom parts 3a are each provided with a plurality (three in FIG. 7, but not limited thereto) of through holes 7 (in the plant cultivating container 14 in FIG. 4, one through hole 7 is provided to each receiver 3).

FIG. 8 is a schematic cross section of the plant cultivating unit 1 (in a state in which the water storage tray 2 and the plant cultivating container 14 are fitted together) of the second embodiment indicated by the arrow line C in FIG. 7. Raised-up bottom parts 2a are formed in the water storage tray 2 as shown in FIG. 8, and the water used can be conserved by providing the minimum necessary water storage space 8. A lid member 29 for closing up the opening 28 is detachably provided to the opening 28 of the plant cultivating container 14, similar to the embodiment described above.

In this other aspect of the second embodiment, the water storage tray 2 is provided with a first fitting part 26, and the plant cultivating container 14 is provided with a second fitting part 27, similar to the embodiment described above, but their positions and shapes are different from those shown in FIGS. 4 through 6. Specifically, the first fitting part 26 is configured as a convexity that protrudes upward in the middle and in both horizontal ends of the top surface of the water storage tray 2, as shown in FIG. 8. The second fitting part 27 is configured as a concavity in the bottom of the plant cultivating container 14, wherein the center and both horizontal ends are made to be raised-up bottoms. The plant cultivating container 14 is placed in the water storage tray 2 so that the convex first fitting part 26 and the concave second fitting part 27 fit together, whereby the plant cultivating container 14 is mounted on the water storage tray 2.

FIG. 9 shows a case in which the plant cultivating container 14 shown in FIGS. 7 and 8 is floated on the water surface 15 of a pond, a river, a lake or the like. In this case, similar to the embodiment described above, a float portion 13 is configured so as to enable the plant cultivating container 14 to float in a manner in which the bottom parts 3a of the receivers 3 are below the water surface 15 of the pond or the like, and the plant cultivating container 14 is provided with connecting parts 11 that enable laterally (horizontally) adjacent plant cultivating containers 14 to be connected together, similar to the embodiment described above.

Figure 10:
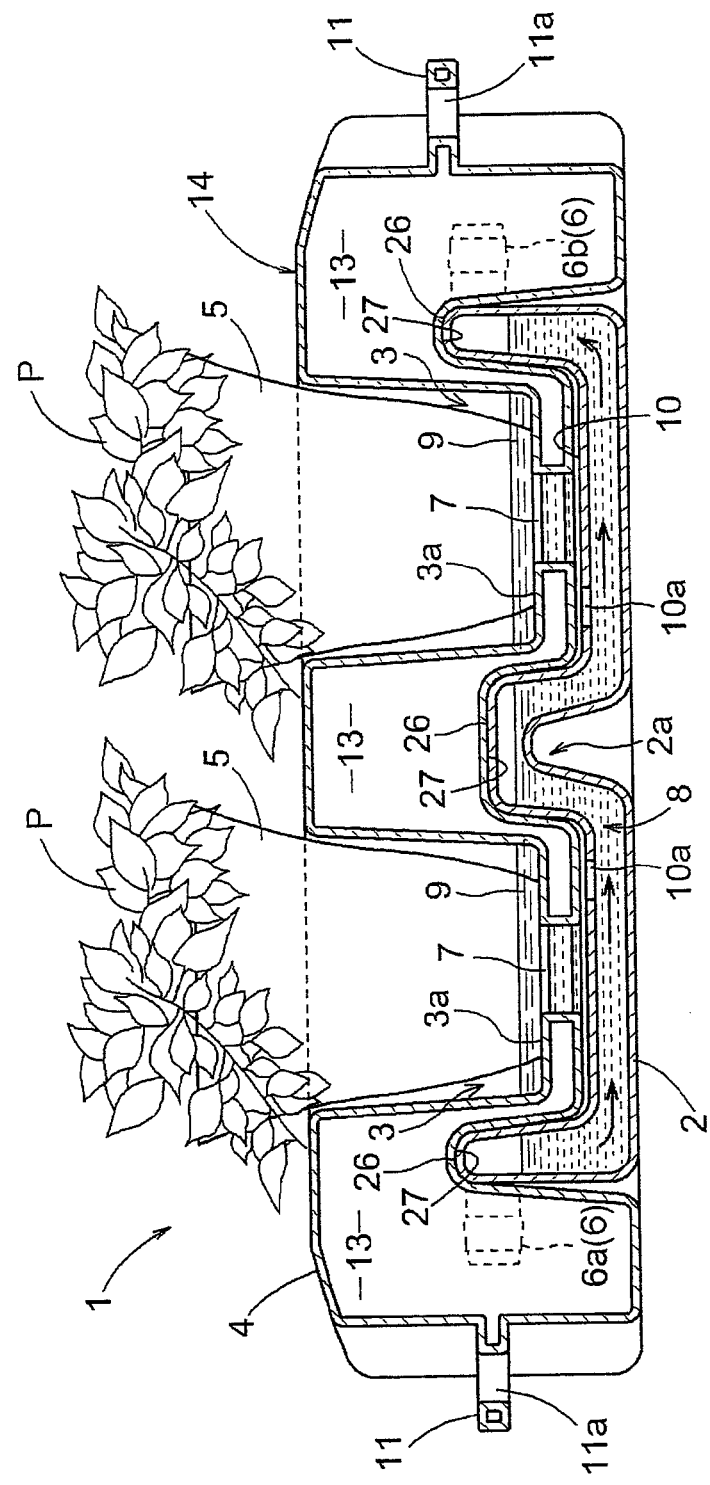
FIG. 10 is a cross-sectional view of the plant cultivating unit according to the second embodiment (another aspect) of the present invention.

FIG. 10 shows another aspect of the plant cultivating unit 1 shown in FIGS. 7 through 9. Specifically, water intake holes 10a in the water storage tray 2 are arranged at lateral positions that are different from those of the through holes 7 provided in the bottom parts 3a of the receivers 3, in a state in which the plant cultivating container 14 is mounted on the water storage tray 2, as shown in FIG. 10 (in FIGS. 7 and 8, the water intake holes 10a in the water storage tray 2 are arranged at the same lateral positions as the through holes 7 provided to the bottom parts 3a of the receivers 3, in a state in which the plant cultivating container 14 is mounted on the water storage tray 2). Thus, the water intake holes 10a and the through holes 7 are placed at different lateral positions, whereby the roots of the plants P are prevented from going through the water intake holes 10a into the water storage space 8, even if the roots pass via the through holes 7. Therefore, the roots of the plants P can be prevented from causing resistance in the water storage space 8 and hindering the flow of the stored water 9.

[Third Embodiment]

Figure 11:
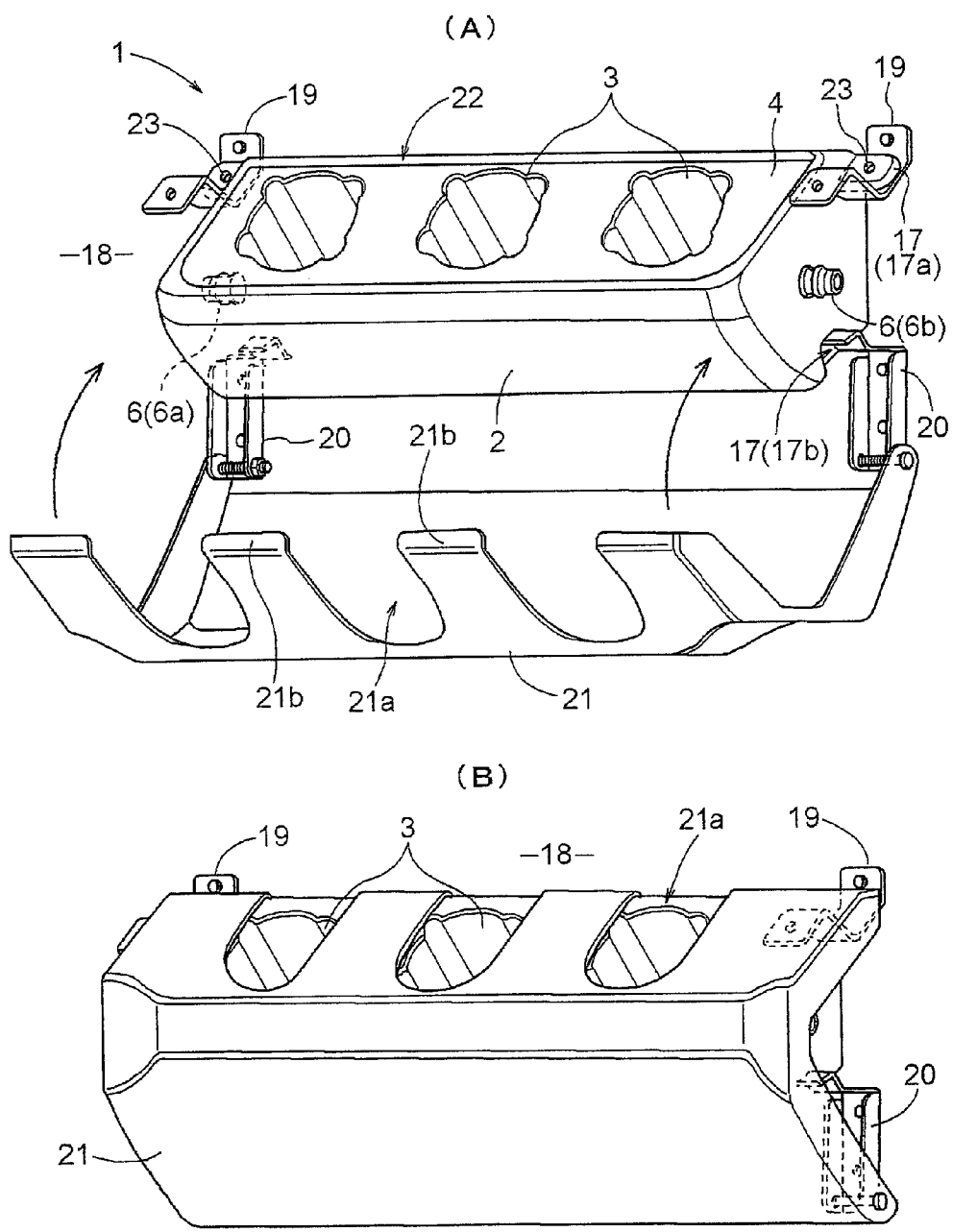
FIG. 11 is an external perspective view of the plant cultivating unit according to a third embodiment of the present invention.

FIGS. 11(A),(B), and 12 show the third embodiment of the plant cultivating unit 1 of the present invention. Similar to the embodiment described above, the plant cultivating unit 1 is configured from a water storage tray 2 capable of storing water for watering plants, a plurality of circular receivers 3 that can house a cultivating bottom layer capable of sustaining plants, and a cover 4 that covers the top of the water storage tray 2, as shown in FIG. 11(A).

The water storage tray 2 is provided with two connecting nozzles 6 (connectors) that can communicably connect adjacent water storage trays 2 to each other, and the connecting nozzles 6 are further distinguished into an inflow connecting nozzle 6a (inflow connector) and an outflow connecting nozzle 6b (outflow connector) according to the direction in which water flows.

Furthermore, the water storage tray 2 is provided with mounting parts 17 (mounting convexities 17a and mounting concavities 17b), and is configured so that the mounting convexities 17a can be locked into the main mounting fixtures 19 mounted in advance on a wall surface 18, and the mounting concavities 17b can be locked onto protective cover mounting fixtures 20 similarly mounted in advance on the wall surface 18.

Specifically, the plant cultivating unit 1 in the third embodiment can be installed on the wall surface 18 by locking the mounting convexities 17a and the mounting concavities 17b onto the main mounting fixtures 19 and the protective cover mounting fixtures 20, respectively, as shown in FIG. 11(A). The main mounting fixtures 19 and the mounting convexities 17a are both provided with bolt holes 23 through which bolts can pass. The bolt holes 23 are aligned, the mounting convexities 17a are mounted on the main mounting fixtures 19, bolts of an appropriate length are passed through the bolt holes 23, and nuts or the like are mounted and fastened from the side opposite the main mounting fixtures 19, whereby the plant cultivating unit 1 can be more reliably fixed in place on the wall surface 18.

A protective cover member 21 (possible examples of the material constituting the protective cover member include stainless steel, FRP (reinforced plastic), and the like) is hinged to the protective cover mounting fixtures 20 and is allowed to swing up and down. The protective cover member 21 is provided with a plurality of openings 21a and locking parts 21b.

The plant cultivating unit 1 of the third embodiment is configured so that after the mounting parts 17 are locked onto the main mounting fixtures 19 and the protective cover mounting fixtures 20, the protective cover member 21 can be raised up to cover the plant cultivating unit 1, and the locking parts 21b of the protective cover member can be hooked and fixed in place over a ridge (locked part 22) provided on the top surface of the plant cultivating unit 1, as shown in FIGS. 11(A) and (B).

At this time, the positions and sizes of the openings 21a in the protective cover member 21 are provided in accordance with the positions and sizes of the receivers 3 so as not to block off the receivers 3 of the plant cultivating unit 1, as shown in FIG. 11(B).

Figure 12:
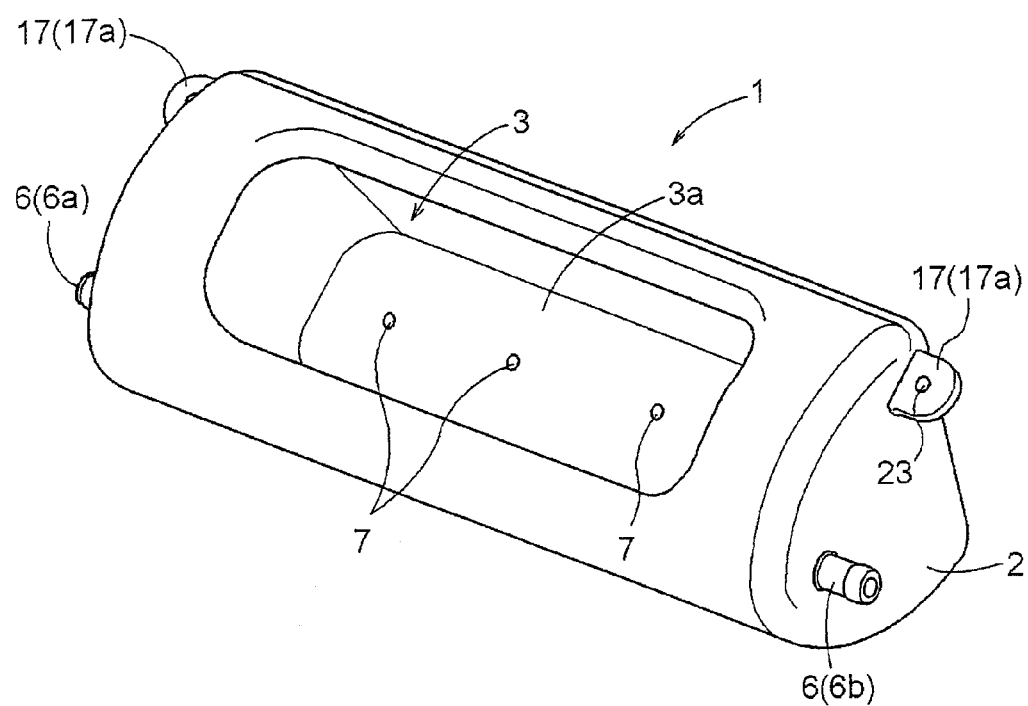
FIG. 12 is an external perspective view of the plant cultivating unit according to the third embodiment (another aspect) of the present invention.

FIG. 12 shows another aspect of the third embodiment. Specifically, the plant cultivating unit 1 of this other aspect has a configuration in which the receiver 3 has a greater width, and the bottom part 3a thereof is provided with a plurality (three are shown in FIG. 12, but the number is not limited thereto) of through holes 7 (in the plant cultivating unit 1 in FIG. 11, each receiver 3 is provided with one through hole 7).

[Other Embodiments]

1. The shape of the plant cultivating unit (circular, square, hexagonal, or the like) and the shape and number of receivers arranged in the plant cultivating unit in the embodiments described above are not particularly limited, and arbitrary configurations can be used as necessary.

2. In the embodiments described above, a plurality of plant cultivating units is communicably connected via connecting hoses, but the configuration is not limited to this option alone, and the connecting nozzles may be directly communicably connected to each other.

3. The installed positions and the number of the connecting nozzles (connectors) provided to the plant cultivating unit of the present invention are not limited to the embodiments described above, and the installed positions and number are arbitrary as long as the configuration allows for appropriate water supply and drainage via overflowing. Therefore, for example, in cases in which the plant cultivating unit is square in shape and four connecting nozzles are provided to the centers of the sides, the entire shape formed when a plurality of plant cultivating units is connected can have greater variation in comparison to plant cultivating units provided with only two connecting nozzles, as in the embodiments described above. Therefore, it is easier to install the plant cultivating units of the present invention in accordance with the size and shape of building sites and rooftops. Unconnected (unused) connecting nozzles may be appropriately provided with a suitable stopper or the like to prevent water from flowing.

Industrial Applicability

The present invention can be applied to various plant cultivating units that comprise a water storage tray in which water can be stored and in which receivers for housing the roots of plants can be arranged in the interior, wherein the water storage space in the water storage tray and the receivers are communicated via water feeders, and the water stored in the water storage space can be supplied to the plants via the water feeders. The present invention can also be applied to various plant cultivating containers that comprise receivers for housing the roots of plants, wherein water feeders communicated with the receivers are provided, and water can be supplied to the plants via the water feeders.

The invention claimed is:
1. A plant cultivating unit comprising:
a water storage tray including a top and a bottom surface;
a plurality of receivers disposed on the top of the water storage tray, the receivers adapted to house roots of plants in an interior thereof and adapted to store water;
a water storage space disposed between the top and the bottom surface of the water storage tray, the water storage space in communication with each of the receivers via at least one water feeder for each of the receivers, the water stored in the water storage space being supplied to the plants via the water feeders; and connectors capable of communicably connecting adjacent water storage trays to each other, wherein the connectors comprise at least one inflow connector and at least one outflow connector, wherein the water flows in through the at least one inflow connector to the water storage space, and wherein the water flows out through the outflow connector by an overflow when a specific amount of water is stored in the water storage space; and wherein the water feeders are below a maximum water level possible when water is stored in the water storage space.

2. The plant cultivating unit according to claim 1, wherein each of the receivers has a concave shape;

wherein a bottom part of each of the receivers is provided with a through hole that functions as the at least one water feeder; and wherein the bottom part is positioned below a maximum water level possible when water is stored in the water storage space.

3. The plant cultivating unit according to claim 1, comprising a cover for covering the top of the water storage tray.

4. The plant cultivating unit according to claim 3, wherein the plurality of receivers and the cover constitute an integrally molded component; and wherein the integrally molded component and the water storage tray are detachable.

5. The plant cultivating unit according to claim 4, wherein the integrally molded component has a float portion adapted to float on a water surface.

6. The plant cultivating unit according to claim 5, wherein the plant cultivating unit is manufactured by blow molding.

7. The plant cultivating unit according to claim 5, wherein the float portion includes surfaces forming a hollow shape;

wherein at least one of the surfaces forming the hollow shape includes an opening for transferring air from within the hollow shape in the float portion to an outside; and wherein the opening is closed off by a detachable lid member.

8. The plant cultivating unit according to claim 3, wherein the cover is provided with connecting parts capable of connecting adjacent covers together in a state in which a plurality of covers is aligned laterally;

wherein at least one connecting part provided on one side and at least one connecting part provided on the other side are disposed in different vertical positions such that the covers can be connected together in a state in which the connecting parts of laterally adjacent covers vertically overlap each other.

9. The plant cultivating unit according to claim 1, comprising mounting parts for mounting the plant cultivating unit on a wall.

10. The plant cultivating unit according to claim 9, further comprising a protective cover member for covering an outer surface of the plant cultivating unit.

11. The plant cultivating unit according to claim 1, further comprising an elevated tray bottom formed in the bottom surface between at least two of the plurality of receivers, wherein the elevated tray bottom protrudes upwardly into the water storage space to a point vertically above a bottom part of each of the receivers.

12. A plant cultivating container comprising:
at least one receiver that houses roots of plants;
at least one water feeder in the at least one receiver for supplying water to the plants, wherein a through hole in a bottom part of the at least one receiver functions as the at least one water feeder;
at least one float portion capable of sealing air so as to provide buoyancy to the plant cultivating container for floating on a water surface, the at least one float portion being a closed space formed between a top surface and a bottom surface of a main unit of the plant cultivating container;
wherein the at least one receiver is formed by a downwardly-protruded part of the top surface and is, laterally surrounded by the at least one float portion; and
wherein the bottom part of the at least one receiver is positioned in relation to the at least one float portion such that, when the plant cultivating container floats in water, the bottom part and the through hole therein is below the water surface so that the bottom part is always retained in a partially-watered state; and wherein the plant cultivating container includes connecting parts capable of connecting adjacent plant cultivating containers together in a state in which a plurality of plant cultivating containers are aligned laterally.

13. The plant cultivating container according to claim 12, wherein the plant cultivating container is configured so that an edge of the main unit of the plant cultivating container is positioned below the bottom part of the at least one receiver.

14. The plant cultivating container according to claim 12, wherein the at least one float portion includes surfaces forming the closed space of the at least one float portion;

wherein at least one of the surfaces forming the closed space includes an opening for transferring air from within the closed space to an outside; and wherein the opening is closed off by a detachable lid member.

15. The plant cultivating container according to claim 12, wherein at least one connecting part provided on one side and at least one connecting part provided on the other side are disposed in different vertical positions such that the plant cultivating containers can be connected together in a state in which the connecting parts of the laterally adjacent plant cultivating containers vertically overlap each other.

* * * * *

UNITED STATES PATENT AND TRADEMARK OFFICE
CERTIFICATE OF CORRECTION

PATENT NO.       : 8,555,547 B2
APPLICATION NO.  : 12/095106
DATED            : October 15, 2013
INVENTOR(S)      : Hashimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this
Fifteenth Day of September, 2015

Michelle K. Lee
*Director of the United States Patent and Trademark Office*